United States Patent
Andree et al.

(10) Patent No.: US 6,839,151 B1
(45) Date of Patent: Jan. 4, 2005

(54) SYSTEM AND METHOD FOR COLOR COPY IMAGE PROCESSING

(75) Inventors: Fred Andree, Brookline, MA (US); Steve Pratt, Acton, MA (US); Shenbo Yu, Nashua, NH (US); Craig Cook, Wayland, MA (US)

(73) Assignee: Zoran Corporation, Sunnyvale, CA (US)

( * ) Notice: Subject to any disclaimer, the term of this patent is extended or adjusted under 35 U.S.C. 154(b) by 0 days.

(21) Appl. No.: 09/496,329

(22) Filed: Feb. 2, 2000

(51) Int. Cl.[7] .......................... H04N 1/40; G06F 15/00; G06K 15/02

(52) U.S. Cl. ........................ 358/2.1; 358/1.9; 358/464; 358/534; 358/453; 358/514; 358/462; 382/164; 382/163; 382/266; 382/206

(58) Field of Search ........................ 358/464, 534, 358/518, 453, 1.9, 462, 2.1, 517, 520, 522, 532, 533, 538, 540; 382/206, 164, 192, 163, 266; 399/190; 375/354; 355/88

(56) References Cited

U.S. PATENT DOCUMENTS

| | | | | |
|---|---|---|---|---|
| 4,403,257 A | * | 9/1983 | Hsieh | 358/2.1 |
| 4,811,115 A | * | 3/1989 | Lin et al. | 382/192 |
| 4,984,283 A | * | 1/1991 | Sakano | 382/206 |
| 5,017,963 A | * | 5/1991 | Tuhro | 399/190 |
| 5,231,677 A | * | 7/1993 | Mita et al. | 382/266 |
| 5,296,939 A | * | 3/1994 | Suzuki | 358/453 |
| 5,313,313 A | * | 5/1994 | Sato | 358/514 |
| 5,341,226 A | * | 8/1994 | Shiau | 358/518 |
| 5,375,197 A | * | 12/1994 | Kang | 358/462 |
| 5,379,130 A | * | 1/1995 | Wang et al. | 358/462 |
| 5,384,648 A | * | 1/1995 | Seidner et al. | 358/534 |
| 5,760,922 A | * | 6/1998 | Kojima | 358/464 |
| 5,768,403 A | * | 6/1998 | Suzuki et al. | 358/2.1 |
| 5,771,107 A | * | 6/1998 | Fujimoto et al. | 358/464 |
| 5,850,298 A | * | 12/1998 | Narahara et al. | 358/518 |
| 5,956,468 A | * | 9/1999 | Ancin | 358/1.9 |
| 6,125,200 A | * | 9/2000 | Warnock | 382/164 |
| 6,233,060 B1 | * | 5/2001 | Shu et al. | 358/1.9 |
| 6,480,623 B1 | * | 11/2002 | Yagishita et al. | 382/163 |
| 6,606,360 B1 | * | 8/2003 | Dunning et al. | 375/354 |

* cited by examiner

Primary Examiner—Edward Coles
Assistant Examiner—Timothy Stephany
(74) Attorney, Agent, or Firm—Lahive & Cockfield, LLP (57) ABSTRACT

A system and method of processing an image including black text data and non-black text data are described. The system and method use a parametric analysis for discrimination of halftones, texts, and photographs. The parametric analysis provides results that track measurable image metrics without the inherent risk of errant decision making during classification. The creation of symbolic representations is intrinsically a classification process that is subject to error. It represents a fundamental departure from fuzzy logic image segmentation. In the parametric analysis, no pattern matching, no auto-correlation, no screening parameter calculation, and no conventional edge detector (such as a high pass filter) are used.

36 Claims, 6 Drawing Sheets

SYSTEM AND METHOD FOR COLOR COPY IMAGE PROCESSING

BACKGROUND OF THE INVENTION

1. Field of the Invention

The present invention relates to the field of image processing. More particularly, this invention relates to the field of image processing for a digital copier.

2. Related Art

The copying of hardcopy pages using digital scan and print devices typically produces undesirable image artifacts. These artifacts result from limitations in spatial resolution and intensity modulation as well as from scan and print engine fidelity issues. They include moiré patterns, poor edge definition, limited dynamic range and visible color fringing. It is possible to minimize and sometimes eliminate these undesirable artifacts by processing the scanned digital image data before printing it. This processing may include smoothing prescreened image data, sharpening edges in text and line art, sharpening photographic data, and removing unwanted background data.

It is highly desirable to identify the contents of a scanned-in image. This is because the choice of appropriate image processing algorithms depends on the image contents. For instance, processing algorithms used for image sharpening will enhance edges in text and line art within the image but may emphasize moir é of halftone data within the image. Therefore, it is necessary to identify image contents by segmenting or classifying the images into homogeneous regions (i.e. regions of a single type of data or classification such as, unwanted background data, text, graphics, and photographic image data) such that the appropriate image processing can be applied to each region within the image.

When dividing the image into homogenous regions, the explicit segmentation or classification process needs to be accurate in order to drive the image operations and ensure accuracy. However, such processes are inherently error prone because of slight variations in image data constituting a given region type. Such errors will result in significant image artifacts due to the wrong type of image processing being applied to conflicting or consistent data types within a single homogenous region.

There have been several approaches taken to solving the problem of region identification, also known as classification, discrimination or segmentation, to distinguish between textual image data, halftone image data, and photographic image date. The first type of approach is direct pattern matching or binary pattern comparison. This process compares cells of the data to known pattern cells constituting the different classifications and then assigns or segments the cells of data into each classification based upon the comparison results. This type of approach is referred to in U.S. Pat. No. 5,771,107 and U.S. Pat. No. 4,984,283. One problem with this type of approach is that the discrimination or segmentation accuracy is dependent upon the size of the data cells and pattern cells which are compared. The smaller cell, the more probability errors may occur. The larger the cell, the more accurate the comparison but even for a 3×3 cell, the computation is still expensive.

The second type of approach, called fuzzy logic image classification, has probabilistic assessments and multi-category classifications. It was attempted to avoid the limitations of explicit classification and the resulting possibility of error by employing non-explicit methods. This kind of method drives image processing algorithms that reflect the uncertainties of the probabilistic analysis. The resulting image artifacts may still be objectionable however. This is because any classification including a non-exclusive probabilistic one is subject to error.

The third type of approach is to detect halftone area by identifying the frequency and angle of screening at which halftones occur. This type of approach is set forth in U.S. Pat. No. 5,384,648. However, this approach only works on images that were originally printed using a one angle Cluster Dot Screening method. Since there are many alternative image output screening techniques, such as multiple angle cluster dot screening, multi-bit screening, or stochastic screening, this approach is not ideal.

The fourth type of approach is using an auto-correlation algorithm to detect halftone image area. However, one disadvantage to this approach is that it cannot distinguish text embedded within halftone image area from the halftone data.

The fifth type of approach is based on edge detecting. An edge detector, usually a high pass filter, such as a Sobel edge detector, is used to detect edges of text and line. A problem that often occurs when this type of approach is used is the erratic discrimination between small Roman letters or small Japanese Kanji and halftone image.

It is necessary to detect and then remove unwanted background data in color copy processing, for example, bleed-through data combined with light-colored background, and white background data. Meanwhile, the highlight color data should be kept as much as possible. Conventionally, white background level was detected by sampling data and calculating a histogram based on scanner RGB data. Bleed-through data combined with light-colored background was still often observed after white background removal.

After the contents are identified, proper image processing methods are applied to these contents. That is, sharpening for text and black text enhancement, descreening for halftone image, and sharpening for photograph image. Black text enhancement is very important because most text in original images to be copied is black. Conventionally, after text edges were detected, text data was passed through under color removal to make text edges neutral. Since many text characters have color fringes beyond the edge after they are scanned, those fringes remain and degrade text quality.

SUMMARY OF THE INVENTION

In view of the known limitations of color copy processing one object of the present invention is to provide a system and method for color copy image processing, which can overcome the problems described above.

Another object of the present invention is to reduce computation cost.

Another object of the present invention is to identify halftone, text, photographic data, and unwanted background data with less error.

Another object of the present invention is to identify halftone area, which could be one angle cluster dot halftone, multiple angle color halftone, stochastic halftone, and multi-bit halftone data.

Another object of the present invention is to distinguish text embedded in halftone image area from halftone data.

Another object of the present invention is to discriminate between small Roman letters or small Japanese Kanji and halftone image.

Another object of the present invention is to detect and then remove unwanted background data. This unwanted data may include white background data as well as data that has bled though from the reverse side of the scanned image.

These and other objects of the present invention are provided for by a system and method of color copy image processing. A system and method of processing an image including black text data and non-black text data are described. The method includes scanning an image and converting it from a color space to a luminance-chrominance space. Unwanted background data are detected and removed. The image is auto-segmented and enhanced.

In accordance with a preferred embodiment of the present invention, parametric analysis and processing are used for discrimination of halftones, text, and photographs. The parametric analysis and processing provides results that track measurable image metrics without the inherent risk of errant decision making during classification. The parametric analysis avoids creating any kind of symbolic representation for the image data. The creation of symbolic representations is intrinsically a classification process that is subject to error. It represents a fundamental departure from fuzzy logic image segmentation. In the parametric analysis, no pattern matching, no autocorrelation, no screening parameter calculation, and no conventional edge detector (such as a high pass filter) need be used.

In accordance with another preferred embodiment, extracted halftone is smoothed, text edge is sharpened, and photographic data is sharpened. The smoothness and sharpness depend on the contents.

In accordance with yet another embodiment, black text data is extracted from input image data and then enhanced. No data accompany the black text data.

In accordance with still another perferred embodiment, unwanted background data is extraced and then removed, including white background data and data that have bled through from the reverse side of the scanned image.

Further in accordance with the present invention, a digital color copy apparatus maximizes output image quality by applying image processing algorithms consistent with the parametric analysis of the input image.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENTS

The figures contained and described herein depict a preferred embodiments of the present invention for purposes of illustration only. One skilled in the art will readily recognize from the following discussion that alternative embodiments of the structures and methods illustrated herein may be employed without departing from the principles of the invention described herein.

Figure 1A:
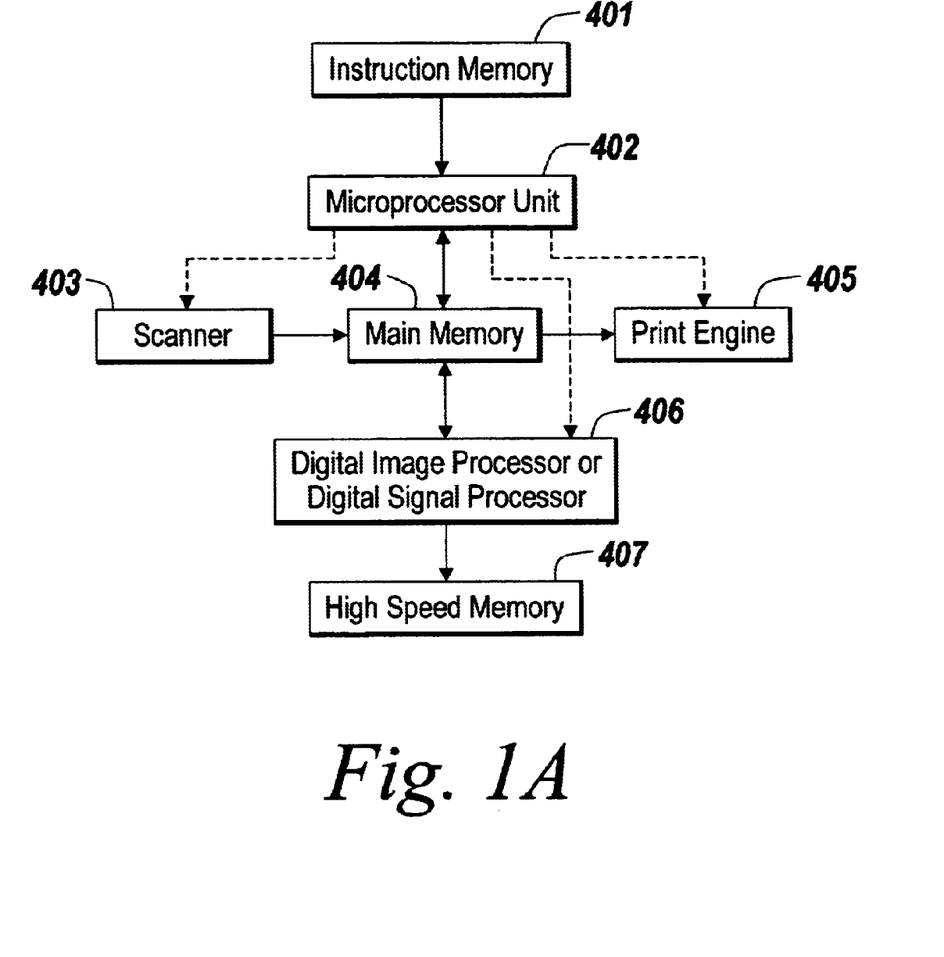
FIG. 1a is a system diagram showing one embodiment of a color copy image processing system, in accordance with the present invention.

Referring now to FIG. 1a, there is shown a system diagram showing one embodiment of a color copy image processing system, in accordance with the present invention. The solid lines show the primary paths of data flow. The dashed lines show control flow. This embodiment is preferred when the order that data comes from the scanner does not match the order that data is sent to the printer. For example, data may come from the scanner on a line by line basis in an RGB format, and this data may be sent to a laser printer in a CMYK format as individual cyan, magenta, yellow and black plane data. The data in the cyan plane can not be completely sent to the printer until the entire image has been scanned and fully processed. At that time the data for the other planes has also been scanned and may have even been fully processed. Accordingly, the main memory is a desirable place to keep the data from each of the other planes.

The instruction memory 401 holds the programs which contain the image processing algorithms executed by the microprocessor unit 402 and the digital image processor or digital signal processor 406. It is preferably comprised of a read only memory, ROM, or an electrically programmable flash memory, such as an EEPROM or flash memory card.

The microprocessor unit 402 controls the scanner 403, the digital image processor or digital signal processor 406 and the print engine 405. It may consist of a Power PC Model No. 403 or similar microprocessor. The microprocessor unit 402 may perform some minor image processing functions; however, the microprocessor unit 402 will typically not be able to operate fast enough to do much of the image processing work. Accordingly, most of the image processing will be performed by the digital image processor or digital signal processor 406. In a preferred embodiment, the microprocessor unit 402 may be used to calculate the white background level and sorts the output data into individual color planes.

The scanner 403 scans the original document and sends digital data to the main memory 404. In a preferred embodiment, this digital data is in an appropriate RGB or black and white data format. In a preferred embodiment, the scanner may be an HP 6250 scanner or any other appropriate scanner capable of handling high speed scanning and data transfer in order to maximize operating speed and efficiently interface with the digital image processor or digital signal processor.

The main memory 404 receives the RGB or black and white data from the scanner 403 and holds that data until the digital image processor or digital signal processor 406 is ready to process the data. The main memory 404 also receives processed image data back from the digital image processor or digital signal processor 406. The microprocessor unit 402 then sorts the processed image data into the individual color planes (e.g. cyan, magenta, yellow and black). As the data is sorted into individual color planes, the data is then restored in the main memory 404 until the print engine 405 is ready to receive the data for printing. In a preferred embodiment, the main memory is comprised of dynamic random access memory.

The print engine 405 receives the individual color plane data from the main memory 404, each color plane at a time—e.g. the cyan color plane data, then the magenta color plane data, etc., and converts the data into signal which is then output from the printer.

The digital image processor or digital signal processor 406 receives the scanned RGB or black and white data from the main memory 404, does all or most of the image processing on that data, and returns image processed data to the main memory 404. It might be a Pixel Magic PM48 or other image processor. Preferably, the digital image processor or digital signal processor 406 operates very fast in comparison to a general purpose microprocessor. The digital image processor or digital signal processor utilizes a small horizontal window that holds several lines of the image data. The contents of this small horizontal window are stored in the high speed memory 407. As processing proceeds, the contents of the window scroll down through the image line by line until all of the image data is processed. Steps 2 through 11 of the flow diagram in FIG. 1c are performed in the digital image processor or digital signal processor 406.

The high speed memory 407 holds the contents of the small moving horizontal window which contains several lines of image data from the image currently being processed. The high speed memory 407 stores instructions for the digital image processor or digital signal processor 406, color conversion tables which are used for color conversion of RGB data into CMYK data (step 7 in FIG. 1c) and dithering or screening tables for dithering operations (step 11 in FIG. 1c). The high speed memory 407 may be comprised of SRAM. Preferably, the high speed memory 407 is able to operate at speeds fast enough so as not to slow down operation of the digital image processor or digital signal processor 406.

Figure 1B:
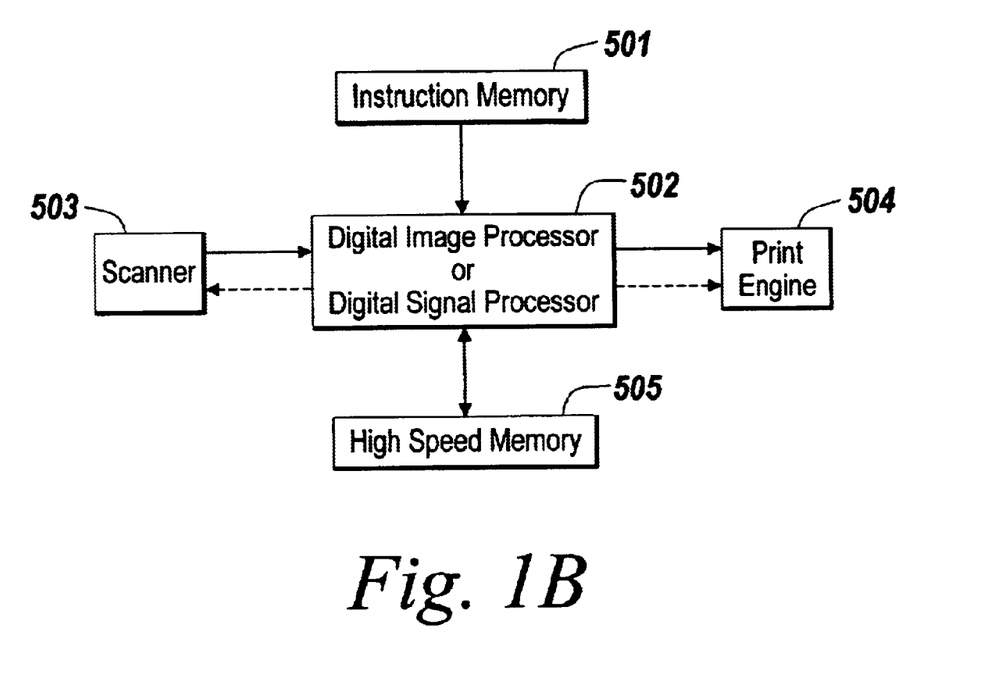
FIG. 1b is a system diagram showing another embodiment of a color copy image processing system, in accordance with the present invention.
Figure 1C:
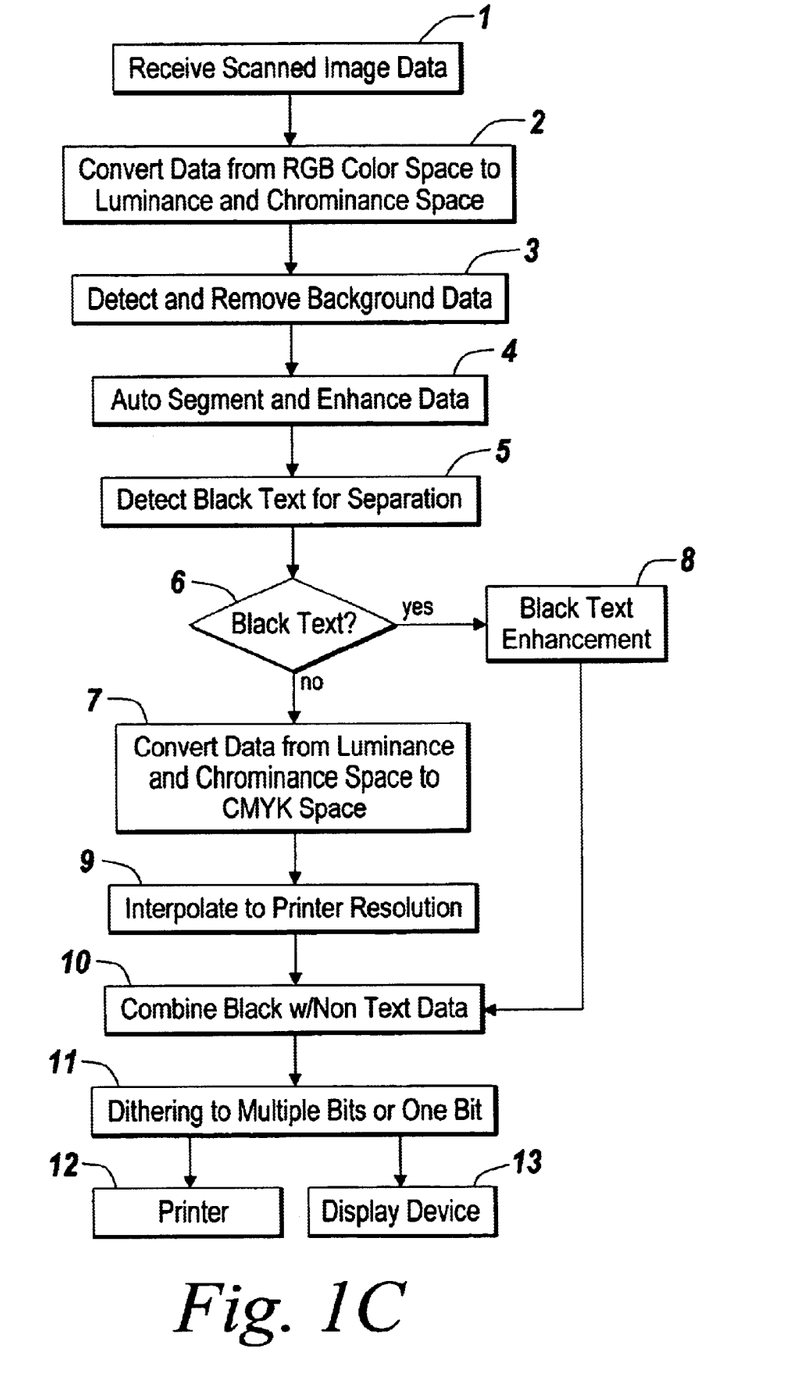
FIG. 1c is a flow diagram illustrating processing in accordance with one embodiment of the present invention.

Referring now to FIG. 1b, there is shown a system diagram showing an alternative embodiment of a color copy image processing system, in accordance with the present invention. The solid lines show the primary paths of data flow. The dashed lines show control flow. This embodiment is preferred when the order in which data is sourced from the scanner matches the order in which the data is sent to the printer. For example, data may come from the scanner line by line in RGB, and data may be sent to an inkjet printer as a mixture of cyan, magenta, yellow and black data, one thin horizontal slice at a time. In this embodiment, the system does not have to work on or store more than one thin horizontal slice at a time. Accordingly, there is no requirement for a main memory large enough to store a full page of image data. This system may also be used for black and white applications, wherein the volume of image data for a full page image is significantly smaller when compared to color applications.

In the embodiment illustrated in FIG. 1b, the instruction memory 501 holds the programs which contain the image processing algorithms executed by the digital image processor or digital signal processor 502. The instruction memory 501 is preferably comprised of a read only memory, ROM, or an electrically programmable flash memory, such as an EEPROM or flash memory card.

The digital image processor or digital signal processor 502 receives digital data from the scanner 503, performs all of the image processing on that data and transmits the fully image processed data to the print engine 504. The image processor 502 may be a conventional processor such as a Pixel Magic PM48 or other image processor which is capable of executing the programs and algorithms and routines described further hereinafter. The digital image processor or digital signal processor 502 preferably operates at much higher speeds than a general purpose microprocessor. The digital image processor or digital signal processor 502 stores a small horizontal window containing several lines of the image data in the high speed memory 505. As processing proceeds the contents of the window scrolls down the image frame line by line. Steps 2 through 11 of the flow diagram in FIG. 1c are performed by the digital image processor or digital signal processor 502 on the contents of the window as it scrolls down the image frame on a line by line basis.

The scanner 503 scans the original document and sends digital data in either an RGB or black and white data format to the digital image processor or digital signal processor 502. In a preferred embodiment, the scanner may be an HP 6250 scanner or any other appropriate scanner capable of handling high speed scanning and data transfers in order to maximize operating speed and efficiently interface with the digital image processor or digital signal processor 502.

The print engine 504 receives the fully processed image data from the digital image processor or digital signal processor 502 and converts it to signal which is then output by the printer.

The high speed memory 505 holds data from a small moving horizontal window which scrolls through the image being processed line by line as the data is being processed. The high speed memory 505 stores instructions for the digital image processor or digital signal processor 502, color conversion tables for color conversion of RGB data into CYMK data (step 7 in FIG. 1c), and dithering or screening tables for dithering operations (step 11 in FIG. 1c). The high speed memory 505 preferably consists of SRAM. In a preferred embodiment, the high speed memory 505 is capable of operating at speeds fast enough not to slow the digital image processor or digital signal processor 502.

Referring not to FIG. 1c, there is shown a logical flow of the image data through a digital image processing system in accordance with the present invention. The digital image processing system processes digital image data by transforming it through multiple color spaces, analyzing it in one or more of those spaces, and then resolving the differences in spatial resolution and intensity depth between the scanner 403 or 503 and printer 12 or display device 13.

Note that in a preferred embodiment, the digital image data received from a scanner consists of three color spaces, red, green, and blue (RGB), while the final output data consists of four color spaces, cyan, magenta, yellow and black. This extra degree of freedom in the output color space provides the ability to represent black image data as pure black (K) as opposed to the combination of three color spaces, cyan, magenta, and yellow (CMY) to produce black (K). In addition, the use of four color spaces allows arbitrary equal amounts of cyan, magenta and yellow to be replaced by black resulting in less colorant being consumed.

In the preferred embodiment, RGB data is first converted into luminance and chrominance information such that the bulk of the image processing takes place in a luminance-chrominance color space commonly referred to as YCaCb. In performing the bulk of the image processing in this color space, the system of the present invention has the advantage of separating luminance (i.e. brightness) information from chrominance (i.e. color) information such that luminance and chrominance information can be processed separately. This separation is important because human visual sensitivities to luminance and chrominance information are very different and the degree of processing which maybe applied to each may vary. For example, human sensitivity to luminance information is greater at higher spatial frequencies than it is for chrominance information. This means that it is very important to retain the spatial resolution of the luminance information. In particular, it is important to remove aliased frequencies which may result from the lower frequency pre-screened images. This is best accomplished by adjusting the data in the luminance channel. The luminance channel contains periodicity information for a wide range of primary color combinations. In addition, it contains most of the information for black text, a frequent occurrence in documents.

Referring again to FIG. 1, in a first step of a preferred embodiment of the present invention, an image is scanned and represented by 8 bit-color RGB data 1. In a second step, this RGB data is converted into luminance and chrominance data YcaCb. The YCaCb space can be NTSC YIQ as described in C. Poynton, A Technical Introduction to Digital Video, p183, John Wiley & Sons, Inc, 1996, and the RGB data is preferably converted using the following equations:

$$Y=0.299*R+0.587*G+0.114*B$$

$$Ca=0.595879*R-0.274133*G-0.321746*B$$

$$Cb=0.211205*R-0.523083*G+0.311878*B$$

It is understood that the color conversion 2 from RGB to YCaCb is well known in the art and easily implemented, for example, by passing the data through the digital image processor or digital signal processor 406 in FIG. 1a and applying the above mentioned algorithms to the RGB data.

Once the RGB data has been converted into luminance and chrominance information, the third step in a preferred embodiment is to detect and remove unwanted background data 3. The detection and removal process is further described in greater detail below with reference to FIG. 2.

Once background information has been detected and removed, the next step in the process of the preferred embodiment is auto segmentation and enhancement of the image in step 4. Auto segmentation and enhancement 4 consists of two-dimensional halftone detection, parametric analysis of the detector output, and application of filter operators. Preferably, the image data output from the auto segmentation and enhancement 4 in the processing method of the present invention remains in the luminance-chrominance color space but contains the results of selective filtering operators, which are halftone smoothing, photograph sharpening, and text sharpening, based on the results of the parametric analysis. Further details concerning the auto segmentation and enhancement processing are provided below in connection with FIG. 3.

As shown in FIG. 1c, the next step in the processing of the digital image data is to extract black text data from mixed the image data 5. Accordingly, black text data, which contains only luminance data and no chrominance data, is separated from the image data, which contains both chrominance information and luminance information. The process of extracting back text data from mixed image data is described in greater detail after the discussion of FIG. 3.

In step 6, if the image data is black text data, the black text data is separately enhanced in step 8. The enhancement process in step 8 includes adjusting the black text to a higher resolution and evaluating it using a threshold. Further details concerning this enhancement process is provided below in connection with FIG. 4.

The remaining, non-textual image data is processed in step 7, where it is converted from luminance-chrominance image data into an output color space. In a preferred embodiment, the output color space consists of cyan, magenta, yellow and black (CMYK). In a preferred embodiment, the color conversion process in step 7 consists of a converting the data from luminance and chrominance (YCaCb) to RGB, and then converting the RGB data into the output color space (CMYK). Corresponding to the above example of conversion from RGB to YCaCb, the algorithm used to recover RGB from YCaCb is also given in C. Poynton's book, A Technical Introduction to Digital Video, p183, John Wiley & Sons, Inc, 1996:

$$R=1*Y+0.956295*Ca+0.621025*Cb;$$

$$G=1*Y-0.272558*Ca-0.646709*Cb;$$

$$R=1*Y-1.104744*Ca+1.701157*Cb;$$

Additionally, the conversion from RGB to the output color space (CMYK) may be done using any process which is well known in the art, such as that which is taught by H. Kang, Color Technology For Electronic Imaging Devices, SPIE Press, 1997.

In step, 9, the non-textual data is then scaled using well known interpolation scaling techniques to scale the data to the required printer 12 resolution or display device 13 resolution. In a preferred embodiment, the interpolation scaling technique used is the same as that set forth in H. Kang's book, Color Technology For Electronic Imaging Devices, SPIE Press, 1997.

In step 10, the monochrome-only textual data, which was enhanced in step 8, is merged back into the black component (plane) together with the black plane of the non-textual image data.

If the bit depth (bits per color plane) of the printer or display device is different from that of the input scanning device, a dithering 11 is applied to the data in order to reduce the overall bit depth of the image data. The image data then flows to a printer 12 or display device 13. Selection of a suitable dithering method is well known and outside the scope of the invention. Otherwise, if the bit depth of the printer or display device matches that of the input scaning device, then the image data directly flows to printer 12 or display device 13.

Figure 2:
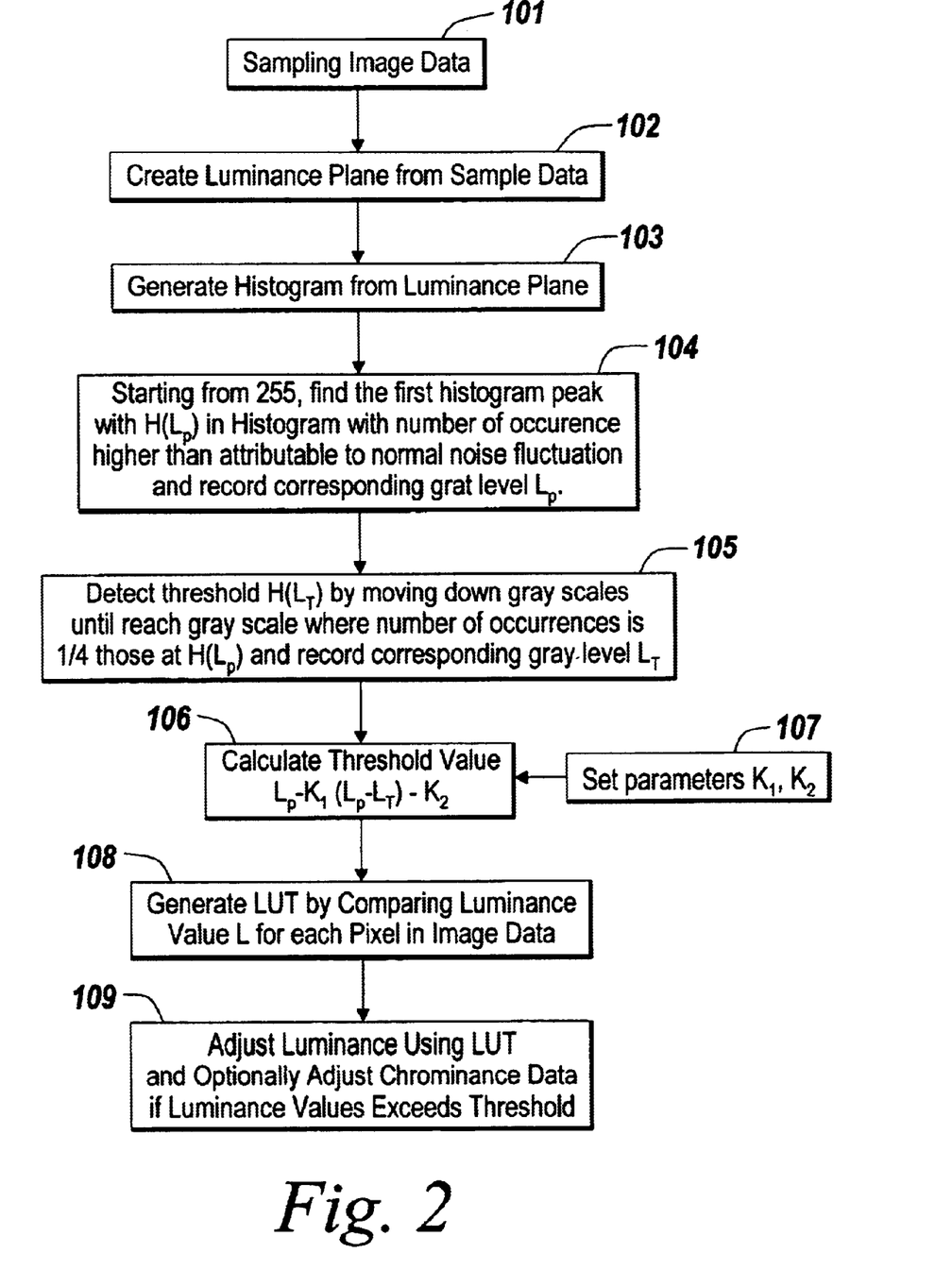
FIG. 2 is a flow diagram showing one embodiment of background detection, in accordance with the present invention.

FIG. 2 shows an arrangement of unwanted background data detection and removal. In the flow diagram shown in FIG. 2, the background data detection is done from step 102 to step 108, in which a look-up table (LUT) is generated. In step 109 of the flow diagram, the background data is removes. In a preferred embodiment, sampling data 101 from the scanned image is to be used for detecting background. In this embodiment, the luminance Y plane sampling data from the sampling image data 102 is separated out and a histogram is generated 103. Preferably, the sampling data from the image can be first few lines of data from the top of the image. In an alternative embodiment, where sampling data may not contain an adequate background portion, a pre-scan may help to detect the background of image. If a pre-scan is used, the sampling data is the whole page image data. The histogram is generated to step 103 to obtain the population of pixels at each gray level. Accordingly, the histogram plots each gray scale along the vertical axis. This process is well known in the art.

In step 104, the first point or gray scale in the histogram where a significant number of pixels are found which exceed that which may be attributable merely to noise, is determined. Accordingly, in a preferred embodiment, the grayscales along the horizontal axis of the histogram range from 0–255 (assuming an 8 bit pixel depth for each color in a preferred embodiment), where 255 is white. Starting from the highest gray scale 255, the first peak in the histogram (local maximum) H(Lp) where the frequency or number of pixels exceeds (>) that which may be attributable to mere noise fluctuation, is the peak level and represents background data. In a preferred embodiment, the number if pixels which may occur at any given grayscale as a result of noise fluctuations is assumed to be 2/1000 of the total number of sampling pixels in the sampling data.

In step 105, starting from the first peak $L_p$ in the histogram, the processor will move lower in gray scale level (one gray scale level at a time) and measure the number of pixels at each subsequent gray scale level. The processor will determine a threshold point at which the frequency or number or pixels occurring drops to be, at most, a quarter of the number of pixels which occurred at the first peak in the histogram, i.e., $$H(L_T) \leq \tfrac{1}{4} H(L_p)$$

In step 106, once the threshold point $L_T$ has been determined, the processor will set a background threshold value. The background threshold value represents a minimum data value, at or above which, a pixel is said to be within the background. In a preferred embodiment, the background threshold value is set in accordance with the following equation:

$$\text{background threshold} = L_p - K_1 (L_p - L_T) - K_2$$

Where $K_1$ and $K_2$ are adjustable input parameters which may be adjusted by a user, based upon trial and error. In a preferred embodiment, $K_1=4$ and $K_2=8$ (Step 107 in FIG. c). The input parameter $K_1$ determines the aggressiveness of the background removal. A large value for $K_1$ will wash or white out darker colors. The input parameter $K_2$ represents the size of a linear transition region. To avoid sharp color transition by direct clipping, a linear clipping transition is used. In step 108, a LUT for linear clipping compensation is built. This LUT is a transformation look-up table that leaves dark color unchanged, whites out background colors and provides a linear transition between these two regions. The LUT is generated using the following comparison:

If gray level L≦threshold

LUT(L)=L

Else if L>(threshold+$K_2$)

LUT(L)=255

Else $LUT(L)=L+(255-K_2-\text{threshold})(L-\text{threshold})/K_2$

Finally in step 109, Y plane data from step 2 in FIG 1c are set to a value in its LUT, while Ca and Cb are set to be 128 when Y plane data are larger than the background threshold value, in order to make the background data an absolute white. In the case where the Y plane data is not larger than the background threshold, the chrominance information in Ca and Cb is left unchanged.

In an alternate embodiment CaCb planes in YCaCb data are kept unchanged to assure background color does not drift.

After background data are removed, the image data is then auto segmented and enhanced, see step 4 in FIG. 1c.

Figure 3:
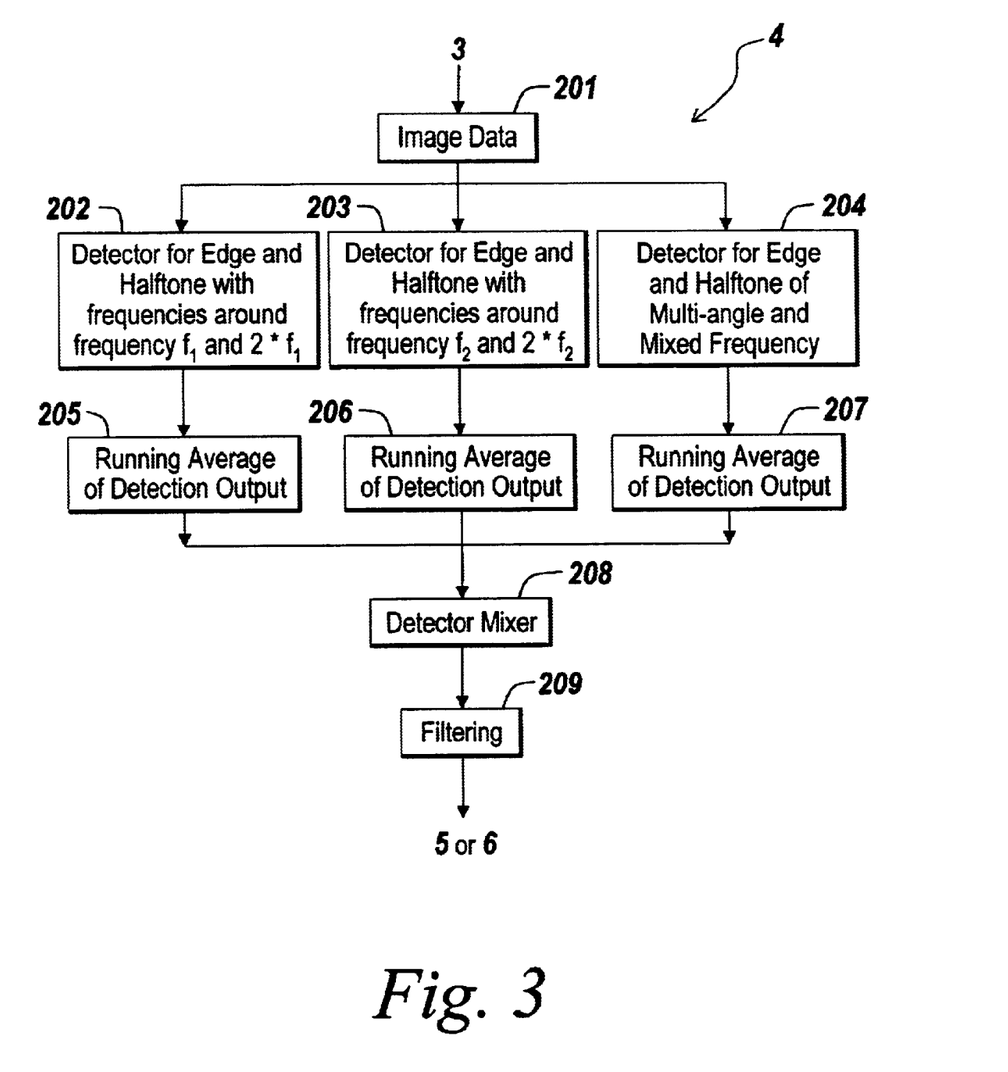
FIG. 3 is a flow diagram showing one embodiment of an auto segmentation algorithm, in accordance with the present invention.

FIG.3 illustrates auto segmentation and enhancement by the parametric analysis and processing. After background data are removed, image data 201 flow to different edge and halftone detectors. These are a detector 202 for edge and halftones with frequencies around frequency $f_1$ and $2^*f_1$, a detector 203 for edge and halftones with frequencies around frequency $f_2$ and $2^*f_2$, and a detector 204 for edge and halftone of multi-angle and mixed frequency. The effective values of frequency $f_1$ and $f_2$ are determined by the input resolution of the image.

In a preferred embodiment, the detectors detect peaks or valleys of halftone and edges of text simultaneously. In accordance with one embodiment, consider the 5×3 neighborhood of samples (g is the current pixel):

$$\begin{matrix} a & b & c \\ d & e & f \\ g & h & i \\ j & k & l \\ m & n & o \end{matrix}$$

When points a and i coincide with the peaks of a 45 degree halftone, points c and g will coincide with the valleys. For 300 dpi data, the halftone data with 100 and 200 line screen frequency can be detected by calculating $$\text{detector1} = (p_a - \text{avg})^*(p_i - \text{avg}) + (p_c - \text{avg})^*(p_g - \text{avg})$$

where avg is the average of all the pixels in the neighborhood (i.e., a, b, c, d, e, f, h, i, j, k, l, m, n, o) and $p_a$, $p_i$, $p_c$, and $p_g$ are pixel values of pixel a, i, c, and g. This calculation will produce strong positive values when g is in halftone regions and strong negative value when g is in text edge.

This halftone detection does not have to be averaged over many samples to give as reliable results as the linear detectors. However it can mistake thin 45 degree lines for halftones. The risk of error can be overcome by taking the minimum of two spatially adjacent detectors. For one embodiment, in the pixel arrangement above, when doing the detection for pixel g, take the minimum of detector1 and $$\text{detector2} = (p_g - \text{avg})^*(p_o - \text{avg}) + (p_i - \text{avg})^*(p_m - \text{avg})$$

That is $$\text{detector} = \text{MIN}(\text{detector1}, \text{detector2})$$

The above detector is very effective in distinguishing small Roman letters or small Japanese Kanji from halftone image.

In accordance with an alternative embodiment, if a larger neighborhood of the current pixel is considered, for example, 7×4 neighborhood of the current pixel m:

$$\begin{matrix} a & b & c & d \\ e & f & g & h \\ i & j & k & l \\ m & n & o & p \\ q & r & s & t \\ u & v & w & x \\ y & z & a2 & b2 \end{matrix}$$

For 300 dpi input data, the halftone data with 65 and 130 line screen frequency can be detected by calculating $$\text{detector1} = (p_a - \text{avg}) * (p_p - \text{avg}) + (p_m - \text{avg}) * (p_d - \text{avg})$$

$$\text{detector2} = (p_m - \text{avg}) * (p_{b2} - \text{avg}) + (p_p - \text{avg}) * (p_y - \text{avg})$$

$$\text{detector} = \text{MIN}(\text{detector1}, \text{detector2})$$

To detect halftone of multiple angle screens as occurs in color halftone and mixed frequency halftone (i.e. stochastic screening), considering the 5×3 neighborhood of samples (g is the current pixel), $$\begin{matrix} a & b & c \\ d & e & f \\ g & h & i \\ j & k & l \\ m & n & o \end{matrix}$$

a horizontal peak detector would be:

$$\text{detector3} = (p_f - p_e) * (p_d - p_e) + (p_i - p_h) * (p_g - p_h) + (p_l - p_k) * (p_j - p_k)$$

This value would be positive to the extent that e, h and k were peaks or valleys with respect to f and d, i and g or l and j. A vertical peak detector would be:

$$\text{detector4} = (p_b - p_e) * (p_h - p_e) + (p_e - p_h) * (p_k - p_h) + (p_h - p_k) * (p_n - p_k)$$

This value would be positive to the extent that e, h and k were peaks in the vertical axis.

Since strong peaks also occur in thin text and text could be considered halftone and get smoothed, it is best to mix the result of the horizontal and vertical detector. In accordance with one embodiment the following algorithm is used:

If detector3<detector4 detector=detector3+detector4/4;

else detector=detector4+detector3/4;

To increase accuracy, several sets of samples may be combined by calculating a running average of results. At each pixel for all detectors, detector value is added to the running average and a fraction of the resulting sum is subtracted from the running average in 205, 206, or 207 respectively for each detector.

When detector results are obtained, they are combined in mixer 208. The maximum detector value of detector for edge and halftone of low frequency 202 and detector for edge and halftone of high frequency 203 are taken. If the value of detector for edge and halftone of multi-angle and mixed frequency 204 is positive, it is added to the maximum.

Now, different types of data can be distinguished. If the final detector value is a large negative value, the current pixel corresponds to text data, whether it is in white background or embedded in halftone area. If the final detector value is a large positive value, the current pixel corresponds to halftone data. If the final detector value is a small negative value, the current pixel corresponds to photographic data.

In 209, image data are sharpened or smoothed depending on local image content as represented by the detector. Because the detector value corresponds to image content, it may be used as a parameter to adjust image data. The two extreme points of detector values are in text data, where the maximum sharpening is applied, and in coarse halftone data, where the maximum smoothing is applied. A histogram of detector values can be used to find these two points. The maximum sharpening point should be somewhere in the text peak in th e histogram. The maximum smoothing point should be somewhere in the halftone peak in the histogram. Any detector value beyond the maximum sharpening point value is capped at the maximum. Any detector value above the maximum smoothing point value is capped at the maximum.

Sharpening and smoothing filters are well known. For example, consider a 3×3 sharpening filter:

$$\begin{matrix} -1 & -1 & -1 \\ -1 & 9 & -1 \\ -1 & -1 & -1 \end{matrix}$$

When this filter is applied to a pixel, the new value of the pixel will be new value of this pixel=old value of pixel+8*(old value of pixel−average of 8 neighbors)

Eight (8) is the sharpening factor by which pixel value is exaggerated by the difference between it and its neighbors. In practice, it is found that a sharpening factor of four (4) does not usually oversharpen images and still sharpens text fairly well. To use the detector value, a sharpening may be applied as follows:

new value=old value+4*detector*(old value−average of 8 neighbors)/(the maximum sharpening point)

As mentioned above, the maximum sharpening point value and detector value are negative when the image should be sharpened. So when the detector value is at or beyond the maximum sharpening point, the image is sharpened by a factor of 4. When the detector value is between the maximum sharpness and 0, the image is sharpened to a lesser extent. To avoid sharpening color edges to black, the CaCb values are checked before a sharpening is applied. If they are too far away from a neutral gray, the detector value is reduced (i.e., the sharpening amount is reduced). Neutral colors, shades of gray, have Ca and Cb values of 127. To calculate how far away from neutral a pixel is, we use:

$$\text{dist} = ABS(Ca - 127) + ABS(Cb - 127)$$

If dist is over 64 we do no sharpening. If dist is between 0 and 64, we reduce the sharpening by:

sharpening=sharpening*(64−dist)/64

In an alternative embodiment, we may apply a 5×5 sharpening filter in place of 3×3 filter, for instance, $$\begin{matrix} -1 & -1 & -1 & -1 & -1 \\ -1 & -1 & -1 & -1 & -1 \\ -1 & -1 & 25 & -1 & -1 \\ -1 & -1 & -1 & -1 & -1 \\ -1 & -1 & -1 & -1 & -1 \end{matrix}$$

For smoothing filters, in a preferred embodiment, a filter $$\begin{matrix} 1/8 & 1/8 & 1/8 \\ 1/8 & 0 & 1/8 \\ 1/8 & 1/8 & 1/8 \end{matrix}$$

is applied. The filtered data will be new value of this pixel=old value of pixel−1*(old value of pixel−average of 8 neighbors)

When the detector value is included, it will be new value=old value−detector*(old value−average of 8 neighbors)/
(the maximum smoothing point)

After step 4 in FIG. 1c, segmentation has been done on the input image and the appropriate smoothing or sharpening has been applied. Text and line art data have been sharpened. Photographs have been mildly sharpened. Halftones have been smoothed.

In step 5 of FIG. 1c, black text and line art are separated from the rest of the image. To do this two different Y planes, the original one after background removal in step 3 of FIG. 1c and the segmented one after step 4 in FIG. 1c are examined. The original one has original Y values for text and white, 255 on a scale of 0 to 255, for the pixels surrounding text. The segmented one has been sharpened in text regions and has black, 0 on a scale of 0 to 255, for text pixels. Pixels that are black in the segmented Y plane are counted as text pixels. Pixels that are adjacent to a black pixel in the segmented Y plane and also adjacent to a white pixel in the original Y plane are also included as text pixels. A pixel can be adjacent to another pixel either horizontally, vertically or diagonally. Thus the text and the text fringe are included as text pixels.

To separate the black text and line art from the rest of the image a separate text Y plane is created and tracked. The Y value that is put in the Y text plane for a text pixel is the Y value from the original Y plane. The Y values for non text pixels in the text Y plane are set to white. The YCaCb values of text pixels are set to white in the segmented image planes; they are left unchanged for non text pixels. Thus pixel values will be white in either the segmented image planes or the text Y plane or both.

In an alternate embodiment the original Y plane data referred to in the preceding two paragraphs is replaced with mildly sharpened Y plane data. This data is generated by mildly sharpening the Y plane data coming out of step 3 in FIG. 1c. The sharpening can be done by applying a filter to the Y plane data. The filter can be, for example, $$\begin{matrix} 0 & -0.75 & 0 \\ -0.75 & 4 & -0.75 \\ 0 & -0.75 & 0 \end{matrix}$$

Figure 4:
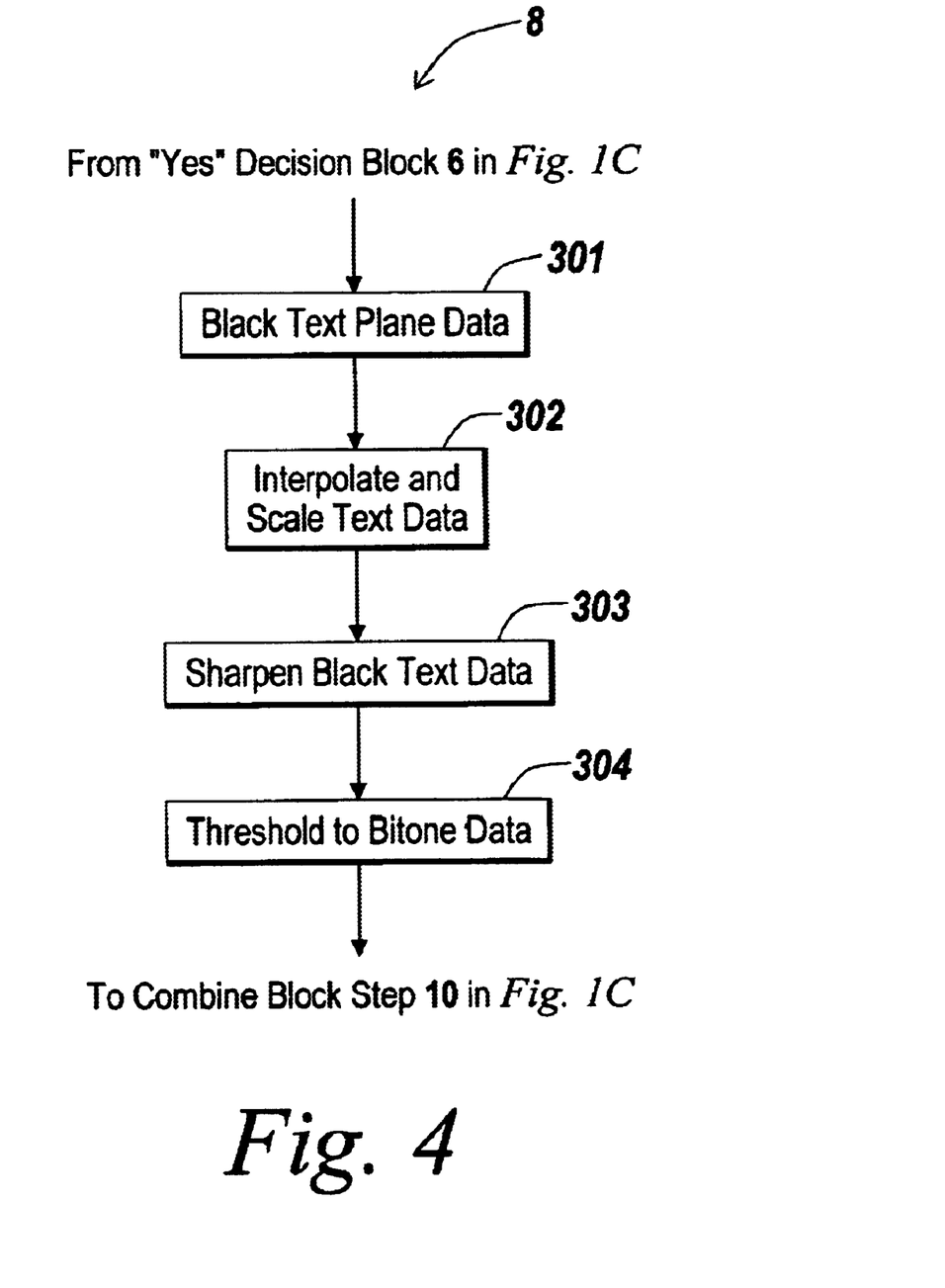
FIG. 4 is a flow diagram showing one embodiment of black text enhancement, in accordance with the present invention.

FIG. 4 shows an embodiment of enhancing black text plane data 301, which consists of interpolated scaling 302 to a higher resolution, in a preferred embodiment 600 dpi, sharpening 303 and thresholding to bitonal (1 bit) data in step 304. Here sharpening filter parameters and the threshold value can be obtained with trial and error.

From the above description, it will be apparent that the invention disclosed herein provides a novel and advantageous system and method of image processing for color copying. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method of processing an image including black text data and non-black text data, the method comprising:
    scanning the image;
    converting the image from a color space to a luminance-chrominance space;
    detecting and removing unwanted background data from the image in the luminance-chrominance space;
    auto segmenting the image in the luminance-chrominance space using a plurality of detectors that operate on adjacent areas of the image to detect edges and halftones of the image; and
    enhancing the image.

2. The method of claim 1 further including extracting the black text data from the image.

3. The method of claim 2 further including processing the black text data separately from the non-black text data.

4. The method of claim 3 further comprising converting the non-black text data from the luminance-chrominance space back into another color space.

5. The method of claim 3 further including combining the separately processed black text data with the non-black text data.

6. The method of claim 1 further including scaling all data to a resolution of an output device.

7. The method of claim 1 wherein the step of auto segmenting the image includes:
    detecting halftone and edge; and
    parametrically analyzing a detector output.

8. The method of claim 7 wherein the step of detecting includes:
    detecting halftones and edges of a first frequency and a second frequency, wherein the first and second frequencies are determined based on a resolution of the image; and
    detecting halftones and edges of multi-angle and mixed frequencies.

9. The method of claim 8 wherein the step of detecting halftones and edges of multi-angle and mixed frequencies includes:
    detecting a horizontal peak;
    detecting a vertical peak; and
    combining results of detecting the horizontal and vertical peaks to detect halftones and edges of multi-angle and mixed frequencies.

10. The method of claim 8 wherein the step of analyzing includes:
    selecting one of values detected for the halftones and edges of the first frequency and the second frequency; and
    reflecting to the selected value a value detected for the halftones and edges of multi-angle and mixed frequencies.

11. The method of claim 10 wherein the reflected value is used to determine whether a current pixel is in text, half tone or photographic data.

12. The method of claim 10 wherein the step of enhancing comprises smoothing the image if the reflected value indicates that the current pixel is in half tone data.

13. The method of claim 10 wherein the step of enhancing comprises sharpening the image if the reflected value indicates that the current pixel is in text data.

14. The method of claim 1 wherein the step of detecting and removing comprises:
    generating a histogram from a luminance plane of the image, the histogram displaying a population of pixels at each grey level in the image;
    determining a threshold value for the unwanted background data of the image based on the histogram;
    setting a size of a linear transition legion from the threshold value;

removing data at a grey level higher than the threshold value plus the transition legion.

15. The method of claim 14 wherein the step of determining comprises:
   determining a first grey level that has a first number of pixels greater than a number of pixels attributed to background noise;
   determining a second grey level at which a number of pixels are less than a predetermined portion of the first number of pixels; and
   determining the threshold value for the unwanted background data of the image based on the first and second grey levels.

16. The method of claim 14 wherein the size of the linear transition legion is taken into account in determining the threshold value for the unwanted background data.

17. The method of claim 14 wherein the step of removing comprises:
   generating a look up table (LUT) that holds pixel data for each grey level of the image;
   and replace the luminance plane data of the image with data in the LUT.

18. A system for processing an image which includes black text data and non-black text data, the system comprising:
   an input device configured to scan the image;
   a first converter configured to convert the image from a color space into a luminance-chrominance space;
   a background detector configured to detect and remove unwanted background data from the image in the luminance-chrominance space; and
   an auto segmenter and enhancer for detecting halftones and edges and parametrically analyzing the detection of halftones and edges,
   wherein the auto segmenter includes a plurality of detectors that operate on adjacent areas of the image to detect halftones and edges of the image in the luminance-chrominance space.

19. The system of claim 18 further comprising a separator configures to detect and separate the black text from the non-black text data.

20. The system of claim 19 further including a textual processor configured to separately process the black text data.

21. The system of claim 20 further including a combiner configured to combine the separately processed black text data and the non-black text data.

22. The system of claim 18 further including a color converter configured to convert the non-black text data from the luminance-chrominance space to another color space.

23. The system of claim 18 wherein the auto segmenter and enhancer includes:
   a plurality of halftone and edge detectors;
   a plurality of averagers; and
   a mixer.

24. A system for processing an image which includes black text data and non-black text data, the system comprising:
   an input device configured to scan the image;
   a first converter configured to convert the image from a color space into a luminance-chrominance space;
   a background detector configured to detect and remove unwanted background data from the image; and
   an auto segmenter and enhancer for detecting halftones and edges and parametrically analyzing the detection of halftones and edges, wherein the auto segmenter and enhancer includes:
   a plurality of halftone and edge detectors;
   a plurality of averagers; and
   a mixer, wherein the plurality of averagers calculates a plurality of running averages for each edge and halftone detector.

25. The system of claim 24 wherein the mixer combines the plurality of running averages for each edge and halftone detector, thereby generating a single parameter.

26. The system of claim 25 further comprising:
   an image enhancer having dynamic filtering which sharpens or smoothes the image data, wherein the dynamic filtering is controlled by the single parameter generated by the mixer.

27. The system of claim 18 further including a multiplier to scale the data to a resolution of an output device.

28. A parametric analyzer for auto-segmentation comprising:
   a plurality of halftone and edge detectors;
   a plurality of averagers, one for each halftone and edge detector, configured to calculate the running average of the output of its halftone and edge detector; and
   a mixer.

29. The parametric analyzer of claim 28 wherein the plurality of halftone and edge detectors includes:
   a first halftone and edge detector for detecting halftones and edges occurring at a first frequency level;
   a second halftone and edge detector for detecting halftones and edges occurring at a second frequency level; and
   a third halftone and edge detector for detecting halftones and edges occurring at multi-angle and mixed frequencies.

30. A method of analyzing image data o comprising
   detecting halftones and edges occurring at a first frequency level;
   detecting halftones and edges occurring at a second frequency level; and
   detecting halftones and edges occurring at multi-angles and mixed frequencies;
   generating three different averages from each of the detected halftones and edges; and
   combining the three different averages.

31. A computer program product for processing digital image data comprising:
   a computer usable medium having computer readable code embodied therein and executable by a processor for causing the processor to perform the steps of:
   receiving image data comprised of non-textual and textual data from a scanner;
   converting the image data from a color space to a luminance-chrominance space;
   detecting and removing unwanted background data from the image data in the luminance-chrominance space;
   auto segmenting the image data in the luminance-chrominance space using a plurality of detectors that operate on adjacent areas of the image to detect edges and half tones of the image; and
   enhancing the image data.

32. The computer program product of claim 31 wherein the computer readable code further causes the processor to perform the additional step of extracting the black text data from the image data.

33. The computer program product of claim 32 wherein the computer readable code further causes the processor to perform the additional step of processing the black text data separately from the non-black text data.

34. The computer program product of claim 31 wherein the computer readable code further causes the processor to perform the additional step of converting the nonblack text data from the luminance-chrominance space back into another color space.

35. The computer program product of claim 34 wherein the computer readable code further causes the processor to perform the additional step of combining the separately processed black text data with the non-black text data.

36. The computer program product of claim 35 wherein the computer readable code further causes the processor to scaling the image data to a resolution of an output device.

* * * * *